United States Patent Office 3,833,511
Patented Sept. 3, 1974

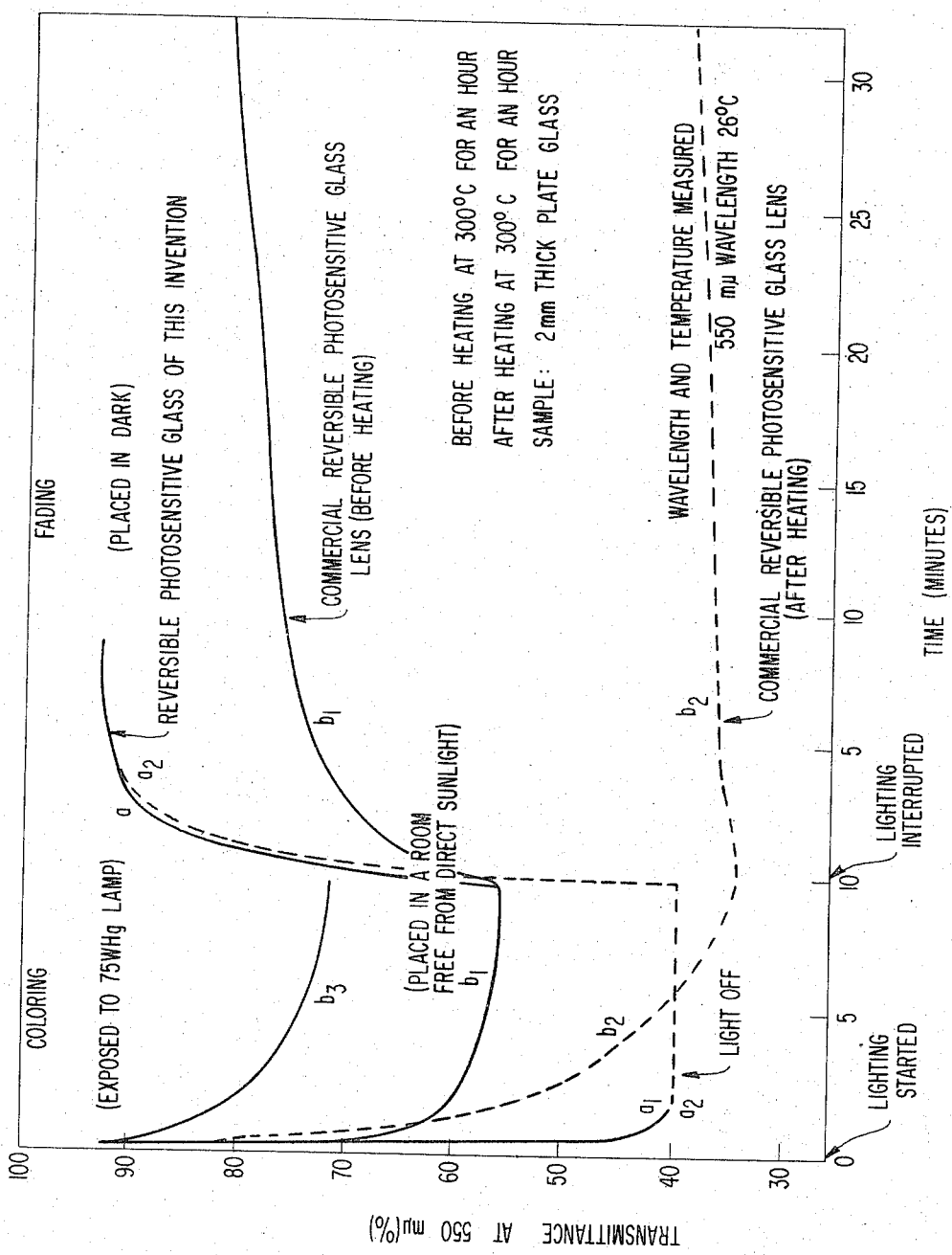

3,833,511
PHOTOCHROMIC GLASS AND PROCESS FOR PRODUCING THE SAME
Toshiharu Yamashita and Tetsuro Izumitani, Tokyo, Japan, assignors to Hoya Glass Works, Ltd., Tokyo, Japan
Filed Mar. 8, 1972, Ser. No. 232,667
Claims priority, application Japan, Nov. 13, 1971, 46/90,909
Int. Cl. G02c 7/10; G02b 9/012; F21v 9/00
U.S. Cl. 252—300          10 Claims

ABSTRACT OF THE DISCLOSURE

A photochromic glass comprising a base glass consisting of certain proportions of $SiO_2Al_2O_3$, $B_2O_3$, $K_2O_3$ and BaO, in which the ratio of $BaO/K_2O$ is 0.05–0.40, and photosensitive ingredients consisting of 0.15–0.7 parts of Ag and one or more of Cl, Br and I in an amount corresponding to more than the chemical equivalent of Ag for every 100 parts of the base glass.

A process for producing the glass by preliminarily heating the glass at a temperature of 300–450° C. for not less than 30 minutes and then further heat-treating the glass at a temperature between the strain temperature and the softening temperature of the glass, thereby improving the photochromic properties.

SIMPLE EXPLANATION OF DRAWING

The figure of the attacked drawing illustrates diagrammatically the comparison in performances of the improved photochromic glass of this invention with a commercial photochromic sunglass lens.

DETAILED DISCLOSURE OF INVENTION

The present invention relates to a photochromic glass in which the degree of light transmittance varies reversibly upon exposure to ultraviolet or short wave visible light.

An object of the present invention is to provide a photochromic glass having superior light response which is suited for use as lenses of reversible sunglasses or glare-proof glasses.

Another object of this invention is to provide an improved photochromic glass whch remains completely transparent in the dark and is not colored substantially with scattered light in a normal room, but is deeply colored or darkened upon exposure to sunlight and it returns completely transparent within a short period of time when the irradiation of light is discontinued.

There are two types of commercially available photochromic glass lenses, i.e., one is an organic lens in which a photochromic coloring matter or photochromic dye-stuff is admixed with a resin, and the other one is an inorganic lens in which silver halide is added into a boro-silicate type glass.

The former lens is generally colored even in the dark and the tone or hue of color varies upon irradiation of light so that it has insufficient function as protective glasses for controlling the intensity of the transmitted light. This type lens also shows a quick fatique tendency and therefore the photochromic sensitivity becomes appreciably poor after only several months use.

On the other hand, the latter type is nearly colorless in the dark and its light transmittance is almost uniformly reduced in the visible range by light irradiation. Though this latter type one is said to have less fatigue tendency, it is slightly colored even upon exposure to a fluorescent lamp or to weak scattering light in the room. Moreover, it has such a slow response to light that it takes as long as more han 5 minutes until the color concentration reduces to half, and takes more than several hours for the complete recovery into initial transparency.

Eyeglass lenses provided with photochromism are very useful since they have both eyeglass and sunglass functions in one lens. However, all the commercially available photochromic lenses have a number of disadvantages, that is, they produce color even in scattered light, they cannot be subjected to vacuum deposition treatment so as to improve light transmittance and they take a fairly long period of time for fading, etc. Therefore, they are not desirable in external appearance and also invite the danger of traffic hazards in places where abrupt changes in light intensity occur such as in tunnels, because the eyesight suddenly weakens upon wearing such glasses. Furthermore, they are sometimes even unhealthful for eyes if worn for a long time because certain types of such photochromic lenses result in light scattering owing to the enlarged size of silver halide for the improvement of photosensitivity, which in turn tends to weaken image contrast.

The present invention has been achieved with the purpose of improving the aforementioned defects of known reversible type photochromic eyeglass lenses.

It has been known in the art to provide photochromic glasses by precipitating microcrystals of silver halide in boro-silicate type glasses. For instance, Japanese Patent Publication No. 11,944/1965 discloses a photochromic glass in which silver halide crystals are precipitated in a glass system of $SiO_2$-$Al_2O_3$-$B_2O_3$-$R_2O$ (wherein $R_2O$ is an alkali metal oxide). More particularly, this patent discloses a process whereby a glass material having photochromism can be obtained by adding as a photosensitizer 0.2% or more (on the basis of chemical analysis) of Cl and 0.2% or more of Ag, and/or more than 0.1% of Br and more than 0.05% of Ag, and/or more tean 0.08% of I and 0.03% or more of Ag, into a borosilicate glass consisting of 40–76% $SiO_2$, 4–26% $Al_2O_3$, 4–26% $B_2O_3$ and $R_2O$ selected from at least one of 2–8% $LiO_2$, 4–15% $Na_2O$, 6–20% $K_2O$, 8–25% $Rb_2O$ and 10–30% $Cs_2O$; subjecting the resulting glass to heat treatment at a temperature between softening point and strain point to hereby precipitate a portion of the silver halide as crystals. Although this patent teaches a fundamental principle relating to a photochromic glass, i.e., the precipitation of microcrystals of silver halide in an inorganic glass, it discloses nothing about the rates of coloring and fading which are very important performances of the eyeglasses made therefrom.

Japanese Patent Publication No. 6,359/1967 deals with a photochromic glass containing copper halide and cadmium halide as photosensitizing ingredients, and teaches that this type of glass has a close relationship between incident light intensity of active radiation to coloring concentration, and that a higher coloring concentration and faster fading rate are attained than with known silver halide-containing photochromic glasses. This patent also recommends, though the reason is not clearly given, a desirable composition for a glass base comprising 40–76% $SiO_2$, 4–26% $Al_2O_3$, 4–26% $B_2O_3$ and at least one of $R_2O$ selected from 2–8% $Li_2O$. 4–15% $Na_2O$, 6–20% $K_2O$, 8–25% $Rh_2O$ and 10–30% $Cs_2O$. This patent also discloses that other ingredients such as fluorine, $P_2O_5$ and certain types of divalent metal oxides such as MgO, CaO, BaO, SrO, ZnO, PbO and the like may be added, but these oxides give little effect to photochromism. The amount of such divalent metal oxides should be controlled so as to prevent the formation of an undesirable crystalline phase which limits the practical utility of the product owing to increased opacity.

Japanese Patent Publication No. 7,478/1967 is an improvement of the foregoing Japanese Patent Publication No. 11,944/1965 and discloses that a minor amount of CdO, subjected to doping, can be added to the photochromic glass composition containing silver halide sensitizer of the preceding patent to thereby greatly improve the fading rate which has been impractical for use as reversible sunglass lenses made from the preceding invention. This patent, however, neither discloses the relationship of the composition of the glass base to the coloring or fading rate, and cites the composition as disclosed in the original patent specification. It is stated in this patent that the addition of divalent metal oxide to the base glass sometimes improves melting, chemical durability, strength and other properties, but such optical ingredients should not be present or be present only in a limited amount in order to avoid opacity due to devitrification.

Japanese Patent Publication No. 16,522/1968 teaches that a photochromic glass having rapid coloring and fading rates can be obtained by heat-treating a $SiO_2$-$B_2O_3$-$R_2O$ type glass containing silver halide to thereby cause phase separation. In this patent, remarkable phase separation should take place during the heat-treatment so that the glass composition to be used comprises as its essential ingredients 40–70% $SiO_2$, 27–50% $B_2O_3$ and 5–12% $R_2O$, and to which less than 6% of $Al_2O_3$ may be added for improving the mechanical property and chemical resistance of the glass, though too much addition thereof is undesirable for the reason that it suppresses the phase separation. The composition inevitably contains a very minor amount of RO ingredient as an impurity, and the presence thereof in a small amount does not significantly affect the phase separation or the photochromism. However, the glass of this patent invention is not suited for use as a photochromic lens because it is accompanied by opalizing due to phase separation of the base glass and has inferior chemical resistance.

The inventors of the present invention have made endeavours for obtaining a photochromic glass having fast coloring and fading rates which are especially desirable for use as eyeglass lenses, and have now found that the composition of the base glass as well as the manner of heat treatment has a great influence on the photochromic property of the glass, and that the selection of optimum kinds, quantity and combinations of alkali and alkali earth metal oxides in the base glass is especially a matter of great importance.

The photochromism of a $SiO_2$-$B_2O_3$-$Al_2O_3$-$R_2O$ type glass varies over a wide range depending upon the kind of $R_2O$ used. For instance, the photochromism of a glass comprising 100 parts of a base glass consisting of 58.9% (in molar percent) $SiO_2$, 25.0% $B_2O_3$, 5.5% $Al_2O_3$ and 10.6% $R_2O$, and as added photosensitizing agents 0.6 part Ag, 1.2 part Cl and 0.015 part CuO, exhibits wide variation as indicated in Table 1 when $R_2O$ is varied over $LiO_2$, $Na_2O$ and $K_2O$. In the table, coloring concentrations are all indicated as optical densities, $To$ is a transmittance of non-irradiated or unexposed glass, $Tr$ is a transmittance after exposure for 3 minutes with a 75 w. mercury lamp at a distance of 20 cm. and $Ts$ is a transmittance after 30 seconds from the termination of irradation. From these data, the following calculations are obtained:

Color density after 3 minutes exposure: $D_I = \log To/Tr$
Color density after 30 seconds from the stop of exposure: $D_S = \log To/Ts$
Initial fading rate (change in density over 30 seconds): $\Delta D = D_I - D_S$ TABLE 1
(Heat treatment 600° C. × 3ᴴ)

| | $D_I$ | $D_S$ | $\Delta D$ |
|---|---|---|---|
| $LiO_2$ | (1) | | |
| $Na_2O$ | 0.23 | 0.14 | 0.09 |
| $K_2O$ | 0.16 | 0.04 | 0.12 |

¹ Not colored.

It will be understood from the results of Table 1 that under a given condition $LiO_2$ did not give any color and $K_2O$ produces poor color density though it exhibits an high initial fading rate. On the other hand, $Na_2O$ alone exhibits good results in both coloring density and initial fading rate. This explains the reason why $Na_2O$ alone is employed as $R_2O$ in all the examples of a number of prior patents referred previously.

The change in photochromism of the glass using $Na_2O$ as $R_2O$ which is substituted with equimolar amount of various alkali earth metal oxides is shown in Table 2.

TABLE 2
(Heat treatmeat 600° C. × 3ᴴ)

| RO | Amount of substitution (mol percent) | $D_I$ | $D_S$ | $\Delta D$ |
|---|---|---|---|---|
| MgO | 3.5 | 0.9 | 0.01 | 0.08 |
| | 7.0 | 0.09 | 0.08 | 0.01 |
| CaO | 3.5 | 0.15 | 0.04 | 0.11 |
| | 7.0 | 0.07 | 0.03 | 0.04 |
| SrO | 3.5 | 0.14 | 0.04 | 0.10 |
| | 7.0 | 0.04 | 0.02 | 0.02 |
| BaO | 3.5 | 0.52 | 0.49 | 0.03 |
| | 7.0 | 0.22 | 0.15 | 0.07 |

It will be noted from the above results that the addition of MgO, CaO and SrO lowers optical density after irradiation and causes a slow down of the initial fading rate. By substituting in a suitable amount with BaO, the optical density can be increased but the disadvantage of significant slow down in the initial fading rate is observed.

For this reason, the prior patents regarded RO as an ingredient which degrades the photochromism.

However, we, the inventors have now found, after elaborate study for clarifying the relationship between the base glass composition and photochromism, that a photochromic glass having high optical density in combination with a remarkably high initial fading rate can be obtained from a $SiO_2$-$B_2O_3$-$Al_2O_3$-$R_2O$ system where the proportion of $B_2O_3$ and $Al_2O_3$ in the glass composition is high, $K_2O$ is used as $R_2O$ and is substituted with a suitable amount of BaO.

A part of such results is shown in Table 3 (in molar percent).

TABLE 3
(heat treatment 600° C. ×5ᴴ)

| | 1 | 2 | 3 | 4 | 5 | 6 | 7 | 8 | 9 | 10 | 11 |
|---|---|---|---|---|---|---|---|---|---|---|---|
| $SiO_2$ | 58.9 | 58.9 | 58.9 | 58.9 | 58.9 | 58.9 | 58.9 | 58.9 | 53.9 | 63.9 | 68.9 |
| $Al_2O_3$ | 5.5 | 5.5 | 5.5 | 5.5 | 5.5 | 0 | 2.5 | 7.0 | 5.5 | 5.5 | 5.5 |
| $B_2O_3$ | 25.0 | 25.0 | 25.0 | 25.0 | 25.0 | 28.9 | 27.1 | 24.0 | 30.0 | 20.0 | 15.0 |
| $K_2O$ | 10.6 | 10.1 | 9.6 | 8.6 | 7.1 | 11.7 | 11.0 | 9.6 | 10.1 | 10.1 | 10.1 |
| BaO | 0 | 0.5 | 1.0 | 2.0 | 3.5 | 0.5 | 0.5 | 0.5 | 0.5 | 0.5 | 0.5 |
| Ag | 0.25 | 0.25 | 0.25 | 0.25 | 0.25 | 0.25 | 0.25 | 0.25 | 0.25 | 0.25 | 0.25 |
| Cl | 1.10 | 1.10 | 1.10 | 1.10 | 1.10 | 1.10 | 1.10 | 1.10 | 1.10 | 1.10 | 1.10 |
| CuO | 0.05 | 0.05 | 0.05 | 0.05 | 0.05 | 0.05 | 0.05 | 0.05 | 0.05 | 0.05 | 0.05 |
| $D_I$ | 0.14 | 0.31 | 0.33 | 0.39 | 0.09 | 0.12 | 0.22 | 0.30 | 0.33 | 0.27 | 0.22 |
| $D_S$ | 0.04 | 0.17 | 0.21 | 0.28 | 0.03 | 0.08 | 0.13 | 0.17 | 0.19 | 0.15 | 0.15 |
| D | 0.10 | 0.14 | 0.12 | 0.11 | 0.06 | 0.04 | 0.09 | 0.13 | 0.14 | 0.12 | 0.07 |
| BaO/$K_2O$ | 0 | 0.051 | 0.104 | 0.233 | 0.493 | 0.043 | 0.045 | 0.052 | 0.051 | 0.051 | 0.051 |

It will be noticed from the results of table 2 that the addition of BaO to a $SiO_2$-$B_2O_3$-$Al_2O_3$-$Na_2O$ system glass composition effectively promotes the increase in optical density but greatly retards the fading rate. On the contrary, the addition of BaO to $SiO_2$-$B_2O_3$-$Al_2C_3$-$K_2O$ system has been now found to accelerate the fading rate. This unique and unexpected effect of BaO is only attained in the case when BaO is combined with $K_2O$ and when the molar ratio of BaO/$K_2O$ is below 0.4, especially within the range of 0.03–0.30. This co-operative effect of BaO-$K_2O$ is much accelerated as the amounts of $Al_2O_3$ and $B_2O_3$ become greater.

The present invention is based upon such a novel discovery.

The mechanism of such a co-operative effect of $K_2O$-BaO has not yet been made clear. According to our investigation, however, a practical glass base composition for use as a photochromic glass lens having high optical density and superior coloring and fading rates is found to reside within the range of 48–60% $SiO_2$, 17–31% $B_2O_3$, 7–11% $Al_2O_3$, 10–16% $K_2O$, 0.5–5% BaO in which the weight ratio of BaO/$K_2O$ is 0.05–0.40.

The presence even in a minor amount of BaO greatly enhances the optical density and also remarkably speeds up, if it is combined with $K_2O$, the fading rate. In order to obtain sufficient density and fading rate required for practical use as reversible sunglasses, it is necessary to add BaO in the amount of more than 0.5% at the BaO/$K_2O$ ratio of not less than 0.05. In the ranges exceeding 5.0% BaO and a BaO/$K_2O$ ratio of above 0.40, the color density and the fading rate become lowered so that the preferred proportion of BaO is determined within the range of 0.5–5.0% and the desirable ratio of BaO/$K_2O$ is similarly defined within the range of 0.05–0.40.

The amount of $K_2O$ added below 10% gives a weak co-operative effect with BaO, and that of above 16% will cause the degradation of the chemical resistance of the glass so that the proportion of $K_2O$ is preferably within the range of 10–16%.

The more the amounts of $Al_2O_3$ and $B_2O_3$, the better the results, since the co-operative effect of BaO-$K_2O$ becomes poor when $Al_2O_3$ is contained below 7% and $B_2O_3$ is below 17%. However, no additional co-operative effect of BaO-$K_2O$ is attainable if the content of $Al_2O_3$ is increased in excess of 11%, but rather results efficiency melting of the glass. The content of $B_2O_3$ in excess of 31% will reduce the stability of the glass and causes phase separation during heat-treatment while resulting in poor transparency. Therefore, $Al_2O_3$ of the range of 7–11% and $B_2O_3$ of the range of 17–31% give most desirable results.

The proportion of $SiO_2$ is preferably within the range of 48–60%, since melting becomes difficult in the range above 60%, and in turn the chemical resistance becomes poorer within the range below 48%.

Substitution of a portion of $B_2O_3$ or $K_2O$ with $ZrO_2$ or $TiO_2$ will impart better chemical resistance, but too much substitution therewith gives poorer photochromism. It is therefore desirable that the addition of $ZrO_2$ or $TiO_2$ should be limited below 5%.

The photosensitizing ingredient to be added per 100 parts of the base glass comprises 0.15–0.7 part Ag and more than the chemical equivalent of a halogen. The use of less than 0.15 part Ag will form less silver halide crystals in the glass so that only insufficient optical density is obtained. The addition of as much as 0.7 part or more of Ag will form a slight opacity in the glass and makes the use as eyeglass lens no longer possible.

The use of halogen in an amount less than equivalent to Ag will cause insufficient color density. Among various halogens, Cl is found to give highest optical density, but a portion of the Cl may be substituted with Br or I so as to expand the wavelength range of the range of photosensitivity.

The addition in a minor amount of CuO is effective for improving optical density, but the addition of CuO contents more than 0.015% will rather lower the optical density.

Having been explained hereinabove, the glass composition of the present invention includes the co-existence of $K_2O$ and BaO as its indispensable matter, and comprises 100 parts of a glass base consisting of 48–68% $SiO_2$ (percent by weight), 7–11% $Al_2O_3$, 17–31% $B_2O_3$, 10–16% $K_2O$ and 0.5–5.0% BaO in which ratio BaO/$K_2O$ is 0.05–0.40; 0.15–0.7 part of Ag, a halogen corresponding to an amount more than the chemical equivalent of Ag and not more than 0.015 part of CuO added to the base glass.

By making such critical determinations in the composition, it is only now possible to obtain a practical photochromic glass having high color density and extremely rapid coloring and fading rates.

We have also made precise investigations on the heat treatment and the condition therefor of the glass of this invention. The conventional heat treatment used hitherto for such a photochromic glass has been generally carried out by simply retaining the glass for a given period of time at a temperature between the strain point and softening point of the glass to thereby precipitate the crystal. We, however, found that a glass having more excellent photochromism than that obtained according to the conventional single heat treatment can be obtained by firstly heat-treating the glass at a temperature below the melting point of silver halide, thereafter heat-treating again at a temperature above the strain point of the glass. For instance, the effect of two-stage heat treatment, i.e., preliminary heat-treatment and successive crysallizing heat-treatment, is shown in Table 4. The experiment was carried using a glass made from 100 parts of a glass base comprising 51.5% $SiO_2$, 8.2% $Al_2O_3$, 25.3% $B_2O_3$, 1.1% BaO and 13.9% by weight $K_2O$; 0.25 part Ag and 1.1 part Cl as photosensitive ingredients and 0.005 part CuO as a sensitizer added to the base glass. The glass of the above composition was melted, cooled, and then subjected to the two-stage heat-treatment.

TABLE 4

| Heat-treating conditions | | Photochromism | | |
|---|---|---|---|---|
| First stage | Second stage | $D_I$ | $D_S$ | $\Delta D$ |
| None | 600° C.×5$^H$ | 0.25 | 0.15 | 0.10 |
| 300° C.×5$^H$ | 600° C.×5$^H$ | 0.27 | 0.15 | 0.12 |
| 400° C×2$^H$ | 600° C.×5$^H$ | 0.28 | 0.15 | 0.13 |
| 400° C.×5$^H$ | 600° C.×5$^H$ | 0.31 | 0.17 | 0.14 |
| 400° C.×10$^H$ | 600° C.×5$^H$ | 0.27 | 0.15 | 0.12 |
| 450° C.×5$^H$ | 600° C.×5$^H$ | 0.25 | 0.14 | 0.11 |

Thus, after the glass has been maintained at 300–450° C. for a suitable period of time, it was subjected to crystallizing heat-treatment of 600° C.×5$^H$ to produce a glass having an improved color density and increased fading rate compared to that obtained without subjecting to the preliminary heat-treatment.

Optimum conditions for each preliminary heat treatment and crystallizing heat-treatment vary depending upon the composition of the glass used. It is preferred, however, to carry out the preliminary heat-treatment at a temperature between 300° C. and 450° C. as to a photochromic glass containing silver chloride, because the treatment requires an extremely prolonged period at a temperature below 300° C. and no effect can be observed at a temperature above the melting point of silver halide crystals present in the glass.

The subsequent crystallizing heat-treatment is preferably conducted at a temperature 50° C.–120° C. higher than the glass transition point for the period of several hours or less, though it can be effected at a temperature above the strain point of the glass, since the operation at lower temperature needs extremely longer period for achieving the increase in optical density and the operation at a temperature above the softening point tends to cause deformation of the molded and shaped lens.

The two-stage heat-treatment process found by the inventors does not only improve the photochromism of the glass but also serves to prevent irregularity of the photosensitive performance to thereby bring about controlled quality upon mass production of photochromic glass lenses. Furthermore, the glass composition of the present invention subjected to the above two-stage heat-treatment can be provided with extremely desirable characteristics required for eyeglasses lenses, i.e., to be free from any coloration under exposure to scattered daytime room light but being highly and quickly colored upon exposure to glaring light.

Commercially available eyeglass lenses have a slow fading rate at a time immediately after the termination of light irradiation and take more than several hours to completely return original transparency. On the other hand, the glass of this invention does not only exhibit a fast initial fading rate but also shows an extremely fast fading time, i.e., usually within several minutes, to return completely into original transparency. Moreover, commercial photochromic lenses of today nearly lose their reversibility after being heated at a temperature of 200° C. or thereabout and almost do not fade any more. On the other hand, no change in the photocromism can be noticed about the glass of this invention even after having been heated at a temperature up to 400° C., so that it is possible to subject the glass to known vacuum deposition treatment for increasing its transmittance.

The fact is evidenced by referring to the following experiments:

A thoroughly mixed material comprising 875.5 g. $SiO_2$, 212.5 g. $Al(OH)_3$, 763.3 g. $H_3BO_3$, 23.8 g. $BaCO_3$, 459.0 g. $KNO_3$, 6.8 g. $AgCl$, 35.7 g. $KCl$ and 0.085 g. $CuO$ is melted in a platinum crucible by heating at 1500° C. in an electric furnace for about 7 hours, then spread over an iron sheet and cooled at a relatively rapid rate to such an extent that no cracking takes place. The glass thus prepared is colored in greenish yellow and exhibits no photosensitivity at this stage, but it turns completely transparent and highly photosensitive after it has once been subjected to the primary heat-treatment of 400° C.×5ᴴ followed by successive crystallizing heat-treatment of 580° C.×1ᴴ.

FIG. 1 of the attached drawing diagrammatically illustrates the comparison of a sample prepared by polishing the resulting glass of this invention into the thickness of 2 mm., with a commercial photochromic eyeglass lens. In this figure, the comparison is made on the darkening and fading rates and also on the thermal stability of such performances.

It will be noticed from the figure that a commercial lens ($b_1$) takes about 10 minutes to reach its maximum density (about 55% in transmittance) when irradiated with a 75 w. mercury lamp at the distance of 20 cm. (corresponding to direct sunlight in daytime), whereas the glass of this invention ($a_1$) reaches its maximum density (approximately 40% in transmittance) within only 2 minutes. When the thus colored glasses are left in the dark, the commercial lens ($b_1$) takes about 10 minutes to return to half the original transparency and takes 7 hours to return completely into the original transparency, whereas the glass of this invention takes only 2 minutes and less than 5 minutes, respectively.

Upon heating at 300° C. for an hour, the commercial lens ($b_2$) deepens its color noticeably, but it hardly fades and never returns into the original transmittance even after leaving for 24 hours, whereas the glass of this invention ($a_2$) exhibits satisfactory photochromism showing no difference from that exhibited at the time prior to the heat-treatment. When placed in a light room free from direct sunlight, the glass of this invention produces no color, whereas the commercial lens colors to the density indicated as $b_3$.

The present invention will be further explained by referring to the following examples in tables in which the compositions are expressed by weight, $D_I$, $D_S$ and $\Delta D$ each has the same meaning as given in Table 1 and $t_s$ is a time in seconds required for 90% recovery into original transparency.

TABLE

|  | 1 | 2 | 3 | 4 | 5 | 6 | 7 | 8 | 9 | 10 | 11 | 12 |
|---|---|---|---|---|---|---|---|---|---|---|---|---|
| $SiO_2$ | 51.5 | 51.5 | 51.5 | 51.5 | 51.5 | 51.5 | 48.5 | 58.5 | 50.9 | 53.5 | 55.5 | 57.5 |
| $Al_2O_3$ | 8.2 | 8.2 | 8.2 | 8.2 | 8.2 | 10.2 | 8.7 | 9.2 | 8.1 | 8.2 | 8.2 | 8.2 |
| $B_2O_3$ | 25.3 | 25.3 | 25.3 | 25.3 | 25.3 | 24.1 | 29.5 | 20.8 | 25.0 | 24.1 | 22.8 | 21.9 |
| $BaO$ | 1.1 | 1.1 | 1.1 | 1.1 | 1.1 | 1.1 | 1.5 | 0.6 | 4.4 | 1.1 | 1.1 | 0.8 |
| $K_2O$ | 13.9 | 13.9 | 13.9 | 13.9 | 13.9 | 13.1 | 11.8 | 10.9 | 11.6 | 13.1 | 12.4 | 11.6 |
| $ZrO_2$ | | | | | | | | | | | | |
| $TiO_2$ | | | | | | | | | | | | |
| Ag | 0.3 | 0.3 | 0.3 | 0.3 | 0.3 | 0.3 | 0.25 | 0.35 | 0.25 | 0.3 | 0.33 | 0.35 |
| Cl | 1.1 | 1.1 | 1.1 | 1.1 | 1.1 | 1.1 | 1.0 | 1.2 | 1.0 | 1.1 | 1.2 | 1.2 |
| Br | | | | | | | | | | | | |
| I | | | | | | | | | | | | |
| $CuO$ | 0.005 | 0.005 | 0.005 | 0.005 | 0.005 | 0.005 | 0.005 | 0.008 | 0.005 | 0.005 | 0.005 | 0.005 |
| $BaO/K_2O$ | 0.079 | 0.079 | 0.079 | 0.079 | 0.079 | 0.084 | 0.127 | 0.055 | 0.379 | 0.084 | 0.089 | 0.069 |
| Heat treatment | {400° C. ×5ᴴ, 620° C. ×1ᴴ} | 400° C. ×5ᴴ | 400×5 600×1 | 400×5 620×1 | 350×5 620×1 | 400×5 625×2 | 350×7 600×1.5 | 420×5 625×1 | 400×5 600×5 | 400×5 620×3 | 400×5 625×3 | 400×5 630×1.5 |
| $D_I$ | 0.38 | 0.30 | 0.36 | 0.40 | 0.36 | 0.35 | 0.25 | 0.30 | 0.35 | 0.33 | 0.32 | 0.30 |
| $D_s$ | 0.12 | 0.05 | 0.11 | 0.18 | 0.10 | 01.5 | 0.09 | 0.17 | 0.23 | 0.15 | 0.16 | 0.17 |
| $\Delta D$ | 0.26 | 0.25 | 0.25 | 0.22 | 0.26 | 0.20 | 0.16 | 0.13 | 0.21 | 0.18 | 0.16 | 0.13 |
| $t_s$ (sec.) | 118 | 96 | 112 | 135 | 123 | 167 | 155 | 203 | 215 | 160 | 183 | 205 |

|  | 13 | 14 | 15 | 16 | 17 | 18 | 19 | 20 | 21 | 22 | 23 |
|---|---|---|---|---|---|---|---|---|---|---|---|
| $SiO_2$ | 51.1 | 56.2 | 50.1 | 50.9 | 49.9 | 15.1 | 51.3 | 51.3 | 51.5 | 51.5 | 59.5 |
| $Al_2O_3$ | 7.9 | 7.5 | 8.4 | 8.4 | 9.5 | 8.1 | 8.2 | 8.2 | 8.2 | 8.2 | 8.2 |
| $B_2O_3$ | 25.2 | 21.3 | 28.4 | 26.0 | 26.0 | 25.1 | 25.3 | 25.4 | 25.3 | 25.3 | 17.3 |
| $BaO$ | 0.9 | 1.1 | 1.4 | 2.0 | 3.0 | 1.1 | 1.1 | 1.1 | 1.1 | 1.1 | 1.1 |
| $K_2O$ | 14.9 | 13.9 | 11.7 | 12.8 | 11.6 | 11.0 | 13.1 | 13.5 | 13.9 | 13.9 | 13.9 |
| $ZrO_2$ | | | | | | 3.6 | 0.9 | | | | |
| $TiO_2$ | | | | | | | | 0.5 | | | |
| Ag | 0.5 | 0.4 | 0.3 | 0.3 | 0.25 | 0.3 | 0.3 | 0.3 | 0.3 | 0.3 | 0.35 |
| Cl | 1.2 | 1.2 | 1.1 | 1.1 | 1.0 | 1.1 | 1.1 | 1.1 | 0.8 | 0.8 | 1.2 |
| Br | | | | | | | | | p.45 | 0.3 | |
| I | | | | | | | | | | 0.3 | |
| $CuO$ | 0.005 | 0.005 | 0.005 | 0.005 | 0.005 | 0.005 | 0.005 | 0.005 | 0.005 | 0.005 | 0.005 |
| $BaO/K_2O$ | 0.060 | 0.079 | 0.100 | 0.156 | 0.259 | 0.100 | 0.084 | 0.081 | 0.079 | 0.079 | 0.079 |
| Heat Treatment | {400° C. ×5ᴴ, 600° C. ×3ᴴ} | 400×5 620×2 | 350×5 580×2 | 400×5 570×2 | 400×5 580×1.5 | 400×5 625×1 | 400×5 600×3 | 400×5 620×10 | 350×7 625×10 | 350×5 630×10 | 400×5 625×1 |
| $D_I$ | 0.31 | 0.27 | 0.35 | 0.33 | 0.35 | 0.29 | 0.30 | 0.28 | 0.22 | 0.20 | 0.26 |
| $D_s$ | 0.18 | 0.14 | 0.19 | 0.18 | 0.20 | 0.12 | 0.13 | 0.10 | 0.06 | 0.04 | 0.14 |
| $\Delta D$ | 0.13 | 0.13 | 0.16 | 0.15 | 0.15 | 0.17 | 0.17 | 0.18 | 0.16 | 0.16 | 0.12 |
| $t_s$ | 219 | 195 | 204 | 212 | 217 | 135 | 142 | 123 | 105 | 100 | 225 |

Thus, when using the improved photochromic glass of this invention a reversible sunglass lens, naked eyes can be well protected from the attack of glaring direct light since the lens immediately colors deeply upon exposure to ultraviolet or short wave visible light while it does not nearly color under scattered light in an ordinary room.

After discontinuing the direct irradiation, it fades within 30 seconds to such a degree as not to substantially weaken eyesight, and completely returns into the original transparency within a few minutes. Moreover, since the lens endures under heating up to 400° C., it can be subjected to transmittance-increasing and the like conventional treatments employed in the field of ordinary eyeglass lenses to thereby produce excellent eyeglass lens.

Though the glass of this invention has superior performances as a material for reversible sunglass lens, it is not limited thereto but can of course be used for various purposes such as window glass of automobiles and display units, etc., where photochromism with rapid darkening and fading response are required.

We claim:

1. An improved photochromic glass consisting essentially of (1) a base glass consisting of 48–60% $SiO_2$, 7–11% $Al_2O_3$, 17–31% $B_2O_3$, 10–16% $K_2O$ and 0.5–5% by weight BaO in which the ratio of $BaO/K_2O$ is 0.05–0.40, and (2) photosensitive ingredients consisting of 0.15–0.7 parts of Ag and one or more halogens selected from the group consisting of Cl, Br, I or mixtures thereof in an amount corresponding to more than the chemical equivalent of Ag per 100 parts of said base glass.

2. A process for producing an improved photochromic glass which comprises preliminarily heating a glass at a temperature of 300–450° C. for a period of not less than 30 minutes, then further heat-treating the glass at a temperature between the strain temperature and softening temperature to thereby improve the photochromism, said glass comprising (1) a glass base consisting of 48–60% $SiO_2$, 7–11% $Al_2O_3$, 17–13% $B_2O_3$, 10–16% $K_2O$ and 0.5–5% by weight of BaO in which the ratio of $BaO/K_2O$ is 0.05–0.40, and (2) photosensitive ingredients consisting of 0.15–0.7 part of Ag and one or more halogens selected from the group consisting of Cl, Br, I or mixtures thereof in an amount corresponding to more than the chemical equivalent of Ag per 100 parts of said glass.

3. The glass of claim 1 wherein the halogen is Cl.

4. The glass of claim 1 wherein the molar ratio of $BaO/K_2O$ is 0.03–0.30.

5. The glass of claim 1 wherein a mixture of halogens is used.

6. The process of claim 2 where the halogen in the glass is Cl.

7. The process of claim 2 wherein the molar ratio of $BaO/K_2O$ in the glass is within the range of 0.03–0.30.

8. The process of claim 2 wherein a mixture of halogens is utilized.

9. The process of claim 2 wherein the further heat treating is at a temperature of 50° C.–100° C. higher than the glass transition point.

10. The process of claim 2 wherein said glass consists essentially of components (1) and (2).

References Cited

UNITED STATES PATENTS

| | | | |
|---|---|---|---|
| 3,649,311 | 3/1972 | Araujo | 252—300 |
| 3,325,499 | 6/1967 | Araujo | 252—300 |
| 3,208,860 | 9/1965 | Armistead et al. | 96—94 |

FOREIGN PATENTS

| | | | |
|---|---|---|---|
| 16,522 | 7/1968 | Japan | 252—300 |
| 7,473 | 3/1967 | Japan | 252—300 |

RONALD H. SMITH, Primary Examiner

J. P. BRAMMER, Assistant Examiner